US012266326B2

(12) United States Patent
Apps et al.

(10) Patent No.: US 12,266,326 B2
(45) Date of Patent: Apr. 1, 2025

(54) BAGPIPE AIR PRESSURE REGULATION DEVICE AND METHOD

(71) Applicant: Chris Apps Reeds LLC, Union, MO (US)

(72) Inventors: Christopher James Apps, Union, MO (US); Roxelyn Apps, Union, MO (US); Patrick N. Wilson, Union, MO (US); Bryan R. Vatterott, Pacific, MO (US)

( * ) Notice: Subject to any disclaimer, the term of this patent is extended or adjusted under 35 U.S.C. 154(b) by 132 days.

(21) Appl. No.: 18/172,279

(22) Filed: Feb. 21, 2023

(65) Prior Publication Data

US 2023/0267897 A1 Aug. 24, 2023

Related U.S. Application Data

(60) Provisional application No. 63/312,242, filed on Feb. 21, 2022.

(51) Int. Cl.
*G10D 9/047* (2020.01)

(52) U.S. Cl.
CPC .................................... *G10D 9/047* (2020.02)

(58) Field of Classification Search
CPC ..................................................... G10D 9/047
See application file for complete search history.

(56) References Cited

U.S. PATENT DOCUMENTS

| | | | | |
|---|---|---|---|---|
| 2,233,507 A * | 3/1941 | Adamson | ............... | G10D 7/063 984/132 |
| 11,869,463 B1 * | 1/2024 | Lazaroff | ................ | G10D 7/063 |
| 2023/0267897 A1 * | 8/2023 | Apps | ...................... | G10D 9/047 84/380 B |

FOREIGN PATENT DOCUMENTS

| | | | | |
|---|---|---|---|---|
| GB | 2401474 A | * 11/2004 | ............. | G10D 7/063 |
| GB | 2452263 B | * 8/2012 | ............. | G10D 7/063 |
| GB | 2514991 A | * 12/2014 | ............. | G10D 7/063 |
| GB | 2577155 A | * 3/2020 | ............. | G10D 7/063 |

* cited by examiner

*Primary Examiner* — Robert W Horn

(57) ABSTRACT

Air pressure regulation devices and methods of using air pressure regulation devices are provided to adjustably control air flow to a bagpipe chanter reed. An air pressure regulation device can include a main body, a valve rotatably attached to the main body, and a cap attached to the main body. The valve may be rotatably adjustable to control an amount of air that flows through the air pressure regulation device. Methods of using an air pressure regulation device may include installing an air pressure regulation device on a bagpipe, adjusting the air pressure regulation device, and playing the bagpipe.

20 Claims, 9 Drawing Sheets

BAGPIPE AIR PRESSURE REGULATION DEVICE AND METHOD

CROSS-REFERENCE TO RELATED APPLICATIONS

This application claims priority to and the benefit of U.S. Provisional Patent Application No. 63/312,242, entitled "Bagpipe Air Regulation Device," filed on Feb. 21, 2022, the contents of which are hereby incorporated by reference in their entirety.

FIELD OF THE INVENTION

The present technology relates to devices and methods to regulate the air pressure on a bagpipe chanter reed.

BACKGROUND

Bagpipe chanter reeds are subject to pitch changes due to variable air pressure. Too high a pressure will result in the pitch going up or becoming too sharp. The reed will lack proper octal balance. Many bagpipe players find it very difficult to maintain a constant air pressure.

Previously known devices for use in bagpipes do not allow for adjustable control over the amount of air supplied to the chanter reed. For example, the bagpipe chanter switch disclosed in GB2452263, is situated between the reed and chanter and is solely designed to shut the air flow off.

Accordingly, it would be beneficial to have a device that could be installed on a bagpipe to regulate the air flow, and thus the air pressure, of the air supplied to the chanter reed.

SUMMARY OF THE INVENTION

Air pressure regulation devices and methods of the present technology can be used to adjustably control air flow to a bagpipe chanter reed.

In at least one aspect, an air pressure regulation device is provided that includes a main body, a valve, and a cap. The main body includes a stem. The valve is valve rotatably attached to the main body, and is rotatably adjustable to control an amount of air that flows through the air pressure regulation device. The cap is attached to the main body. In at least some examples, the valve includes at least one air flow aperture. Additionally, the cap may include at least one air flow aperture. The valve has an open position and a closed position, and may have a plurality of intermediate positions between the open position and the closed position.

In one embodiment of an air pressure regulation device, the air pressure regulation device includes a main body, a valve, a lever and a cap. The main body may include a stem and a platform, the stem being configured to slidably insert into an upper portion of a bagpipe chanter stock, and the platform having a lever aperture and a first air flow aperture. The valve may be rotatably attached to the platform of the main body. The valve may include an air flow cover aligned over the first air flow aperture. The air flow cover may include a closed end, an open end, and a tear shaped second air flow aperture, and the valve may be rotatably adjustable to control an amount of air that flows through the air flow aperture. The lever may extend through the lever aperture and connects to the valve such that movement of the lever causes the valve to rotate. The cap may be attached to the main body and the valve, and may include a third air flow aperture that is aligned over the first air flow aperture, with the air flow cover being located between the third air flow aperture and the first air flow aperture.

In another embodiment of an air pressure regulation device, the air pressure regulation device includes a main body, a valve, and a cap, wherein the cap slidably engages the valve, and the valve slidably engages the main body portion. The main body may include an inner shaft, and the air passage may extend through the stem and the inner shaft. The inner shaft may include at least one boss at an upper end of the inner shaft. The valve may include at least one slot that receives the at least one boss of the main body. The valve may include an air flow cover that includes at least one air flow aperture, an intermediate shaft that extends between the first end and a second end, and a dial at the second end. The cap may include a top surface and an outer shaft, and the top surface may include at least one air flow aperture.

In another aspect, a method of using an air pressure regulation device to play a bagpipe is provided that includes: installing an air pressure regulation device on a bagpipe; adjusting the air pressure regulation device; and playing the bagpipe.

BRIEF DESCRIPTION OF THE DRAWINGS

Specific examples have been chosen for purposes of illustration and description, and are shown in the accompanying drawings, forming a part of the specification.

Figure 1:
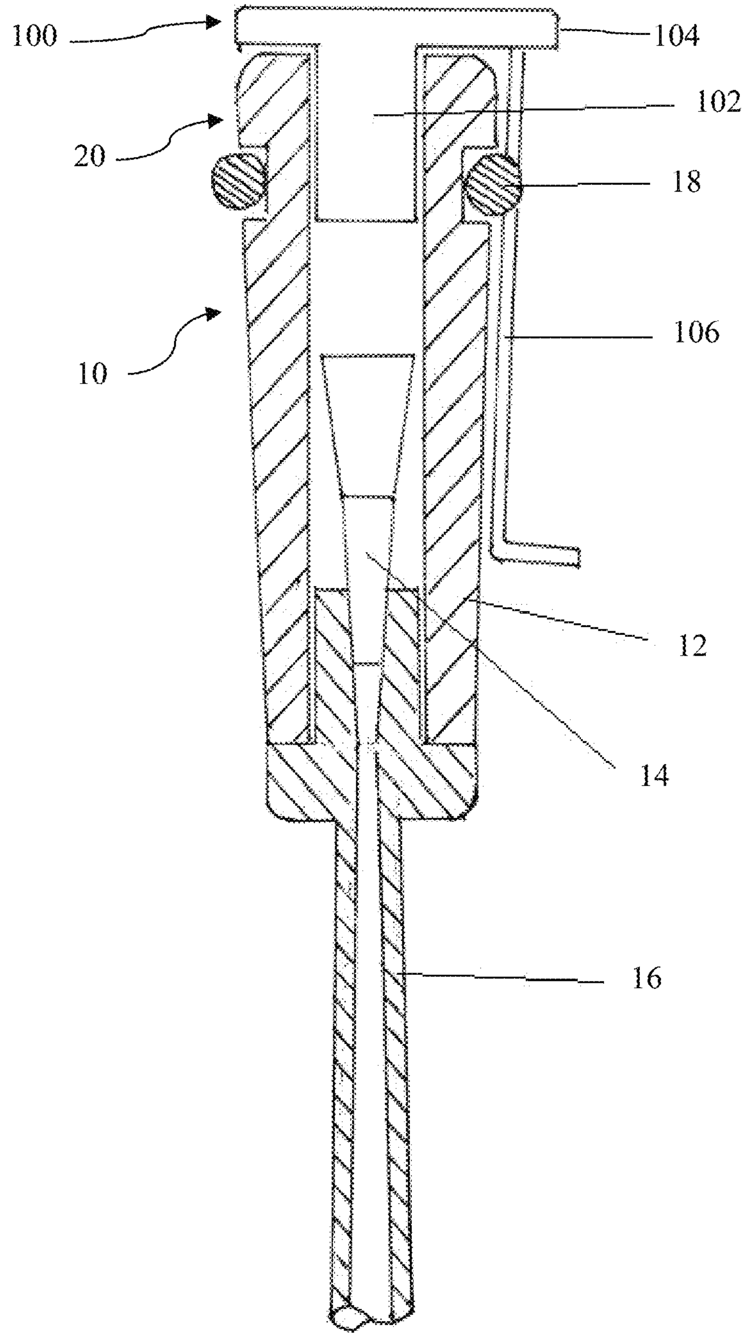
FIG. 1 illustrates a cross-sectional view of one embodiment of an air pressure regulation device of the present technology, installed in a bagpipe.

While various embodiments discussed herein are amenable to modifications and alternative forms, aspects thereof have been shown by way of example in the drawings and are described in detail herein. It should be understood, however, that the disclosure is not limited to the particular embodiments described, and instead is meant to include all modifications, equivalents, and alternatives falling within the scope of the disclosure. In addition, the terms "example" and "embodiment" as used throughout this application is only by way of illustration, and not limitation, the Figures are not necessarily drawn to scale, and the use of the same reference symbols in different drawings indicates similar or identical items unless otherwise noted.

DETAILED DESCRIPTION

Generally, air pressure regulation devices of the present technology, and methods of using such devices, are designed to enable a bagpipe player to adjust the air flow and air pressure supplied from the pipe bag to the chanter reed. Air pressure regulation devices of the present technology may allow the player to increase, decrease, or shut-off the air that is supplied to the chanter reed. Providing control over air flow through air pressure regulation devices of the present technology allows the player to control the air pressure delivered to the chanter reed, and may allow the payer to reduce or eliminate rises in pitch due to too much air pressure.

Generally, air pressure regulation devices of the present technology include a main body, a valve, and a cap. The main body includes a stem that includes an air passage. The valve is valve rotatably attached to the main body, and is rotatably adjustable to control an amount of air that flows through the air pressure regulation device. The cap is attached to the main body.

FIG. 1 illustrates one embodiment of an air pressure regulation device 100 of the present technology installed in a bagpipe 10. As shown, the air pressure regulation device 100 is configured to fit, and fits, into the upper portion 20 of the chanter stock 12, and rests above the chanter reed 14, which is connected to the chanter 16. As used herein, the term "configured to" means that the component is structurally and functionally designed and formed to do whatever the component is said to be configured to do. During operation, air flow to the chanter reed 14 is directed first through the air pressure regulation device 100.

Figure 2:
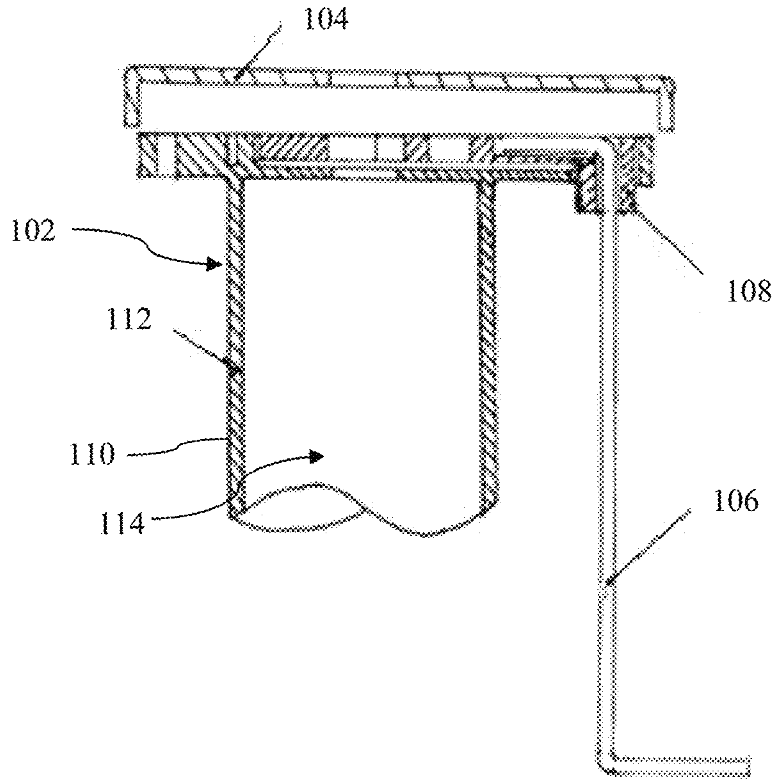
FIG. 2 illustrates a cross-sectional view of the air pressure regulation device of FIG. 1.

FIGS. 2-6 illustrate views of the air pressure regulation device 100 in isolation. FIG. 2 is a cross-sectional view of the air pressure regulation device 100, which includes a main body portion 102, a cap 104, an adjuster, which in this embodiment is lever 106, and a valve 108. FIGS. 3-6 illustrate the main body portion 102, the valve 108, the cap 104, and the lever 106, respectively.

Figure 3:
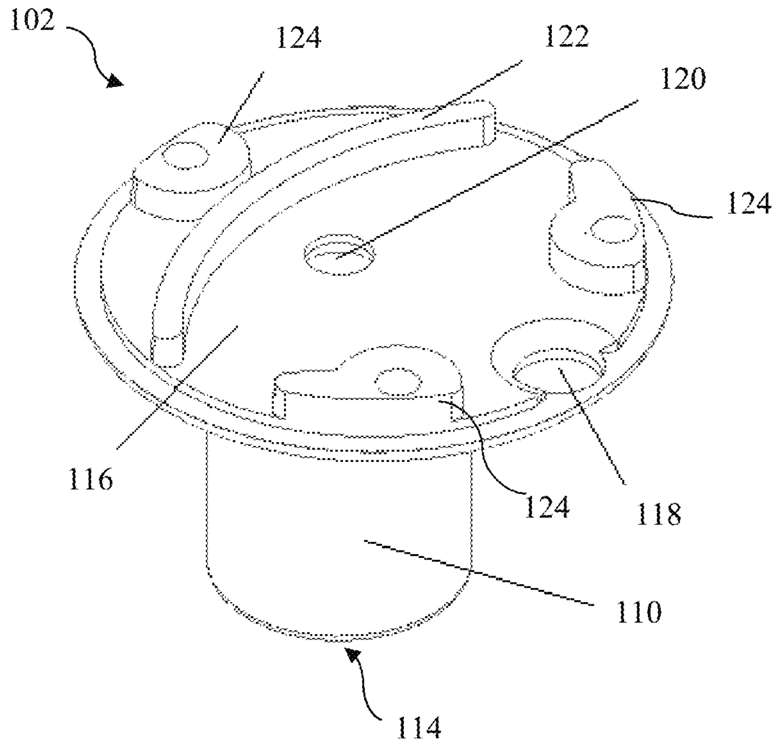
FIG. 3 illustrates a perspective view of the main body portion of the air pressure regulation device of FIG. 1.

Referring to FIGS. 1-3, the main body 102 includes a stem 110, also referred to as a tenon, that fits into the chanter stock. Specifically, the stem 110 is configured to slidably insert into the upper portion 20 of the chanter stock 12. The stem 110 is shaped as a hollow cylinder, having an outer wall 112 and an air passage 114. For reference, a bagpipe will often have an o-ring 18 that extends around the stock 12 to attach the bag of the bagpipe to the stock 12. The air regulation device 100 may extend into the upper portion 20 of the chanter stock 12 so that the end of the air regulation device 100 is about even with the o-ring 18.

The main body 102 also includes a platform 116. The platform 116 may have a circular shape, and is mounted eccentrically on the stem 110, which allows the lever 106 to operate the valve 108 whilst remaining clear of the chanter stock 12. The platform 116 includes a lever aperture 118, through which the lever 108 extends. The platform 116 also includes an first air flow aperture 120 positioned over the air passage 114, so that air flowing through the first air flow aperture 120 passes into and travels through the air passage 114. The first air flow aperture 120 allows the desired amount of air pressure to be supplied to chanter reed 14. The platform 116 also includes a guide 122, which engages with and guides the valve 108. In the illustrated embodiment, the platform 116 also includes a plurality of fasteners 124 that are configured to secure the cap 104 to the main body 102. Each fastener 124 may be any suitable type of fastener, such as a grommet. Additionally, while three fasteners 124 are shown, any suitable number of fasteners may be used.

Figure 4:
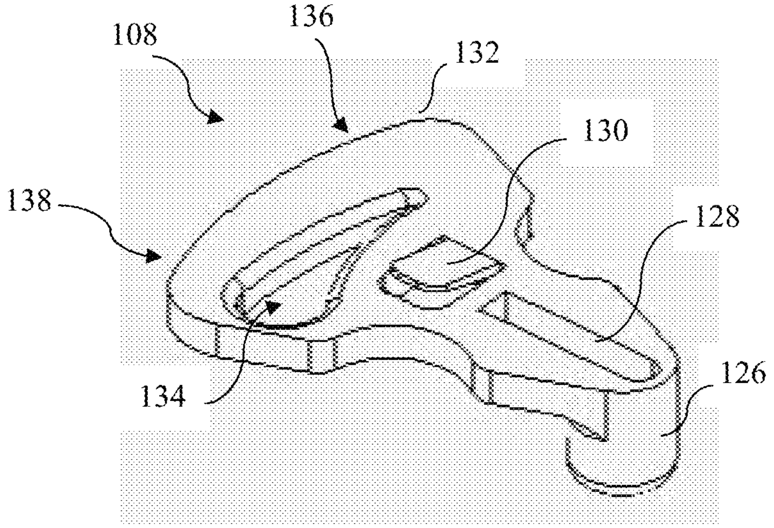
FIG. 4 illustrates a perspective view of the valve portion of the air pressure regulation device of FIG. 1.

FIG. 4 illustrates the valve 108, which can be used to adjust the amount of air that flows through the first air flow aperture 120 to the air passage 114. The valve 108 includes a grommet 126 and a lever receiver 128. The grommet 126 is configured to slidably insert into the lever aperture 118 such that a portion of the lever 106 extends though the grommet 126. The lever receiver 128 is configured to receive and retain the first end 146 of the lever 106.

The valve as illustrated also includes a spring latch 130 that attaches the valve 108 to the underside 142 of the cap.

The valve 108 includes an air flow cover 132 that includes a second air flow aperture 134. The air flow cover 132 is configured to rotate directly above the first air flow aperture 120. The second air flow aperture 134 is tear shaped and aligned such that the air flow cover 132 has a closed end 136, that completely covers the first air flow aperture 120 when the air flow cover 132 is in a first position, and an open end 138, that completely uncovers the first air flow aperture 120 when the air flow cover 132 is in a second position. When the lever is moved by a player, the movement of the first end 146 of the lever causes the valve 108 to rotate from the first position to the second position, or any desired intermediate position between the first position and the second position. The tear shape of the second air flow aperture 134 results in the first air flow aperture being covered in varying degrees as the valve 108 rotates, allowing incremental adjustment of the amount of air that flows through the valve 108 and the first air aperture 120.

In the illustrated example, the lever 106 can be used to rotate the valve clockwise and counterclockwise. The first position, when the closed end 136 of the air flow cover 132 completely covers the first air flow aperture 120, closing off any air flow through the first air flow aperture 120, is the most counterclockwise position. Air flow to and through the first air flow aperture 120 can be provided by rotating the valve 108 in a clockwise direction, using the lever 106, to any intermediate position, up to the second position in which the open end 138 is positioned over and completely uncovers the first air flow aperture 120.

Figure 5:
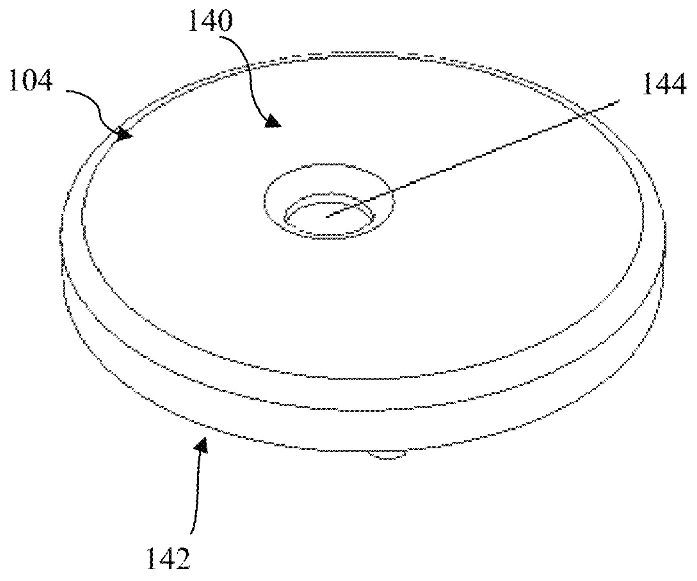
FIG. 5 illustrates a perspective view of the cap portion of the air pressure regulation device of FIG. 1.

FIG. 5 illustrates the cap 104, which has a top side 140, an underside 142, and a third air flow aperture 144. The underside 142 of the cap is configured to connect to the valve 108 via the spring latch 130, and to the main body 102 via the fasteners 124. The cap 104 holds the air pressure regulation device 100 together once the pieces are assembled. The third air flow aperture 144 is aligned over the first air flow aperture 120, with the air flow cover 132 being located between the third air flow aperture 144 and the first air flow aperture 120.

Figure 6:
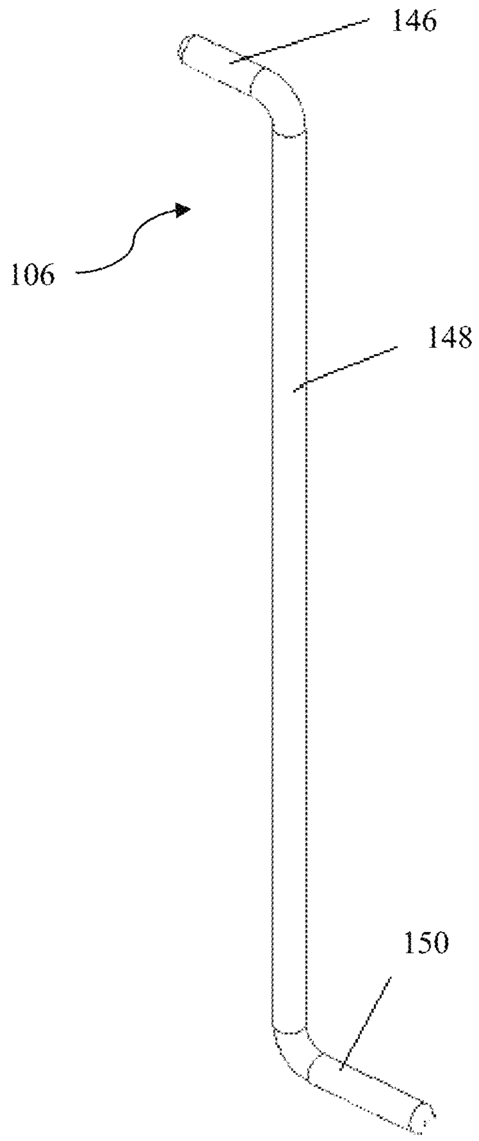
FIG. 6 illustrates a perspective view of the lever portion of the air pressure regulation device of FIG. 1.

FIG. 6 illustrates the lever 106, which attached to the platform 116 of the main body 102 via the lever aperture 118, and to the valve 108 via the grommet 126 and the lever receiver 128. The lever 106 includes a first end 146 that is configured to be received and retained by the lever receiver 128. The lever 106 also includes a shaft 148 that extends downwardly at an angle, which may be about 90°, from the first end 146. The shaft 148 extends through the lever aperture 118 and the grommet 126. The lever also extends out of the bagpipe from the main body 102 of the air pressure regulation device 100. Referring to FIG. 1, the o-ring 18 may be modified to accommodate the lever extending past the o-ring 18. For example, a portion of the o-ring 18 may be removed, or the o-ring may be formed with a notch or flattened portion, so that the o-ring 18 does not interfere with movement of the lever 106. Referring back to FIG. 6, the lever 106 also includes a second end 150, which may extend from the shaft 148 at an angle, which may be about 90°, and function as a handle that the player can use to adjust the valve 108.

During operation, a first amount of air flows through the third air flow aperture 144, and is regulated based on the position of valve 108, and thus the air flow cover 132. All, none, or any portion of the first amount of air may be permitted to pass through the air flow cover 132 to the first air flow aperture to travel to the chanter reed, depending upon whether the air flow cover is in the second position, first position, or an intermediate position, respectively. The player can change the position of the valve 108, and thus the air flow cover 132, by operating the lever 108.

Figure 7:
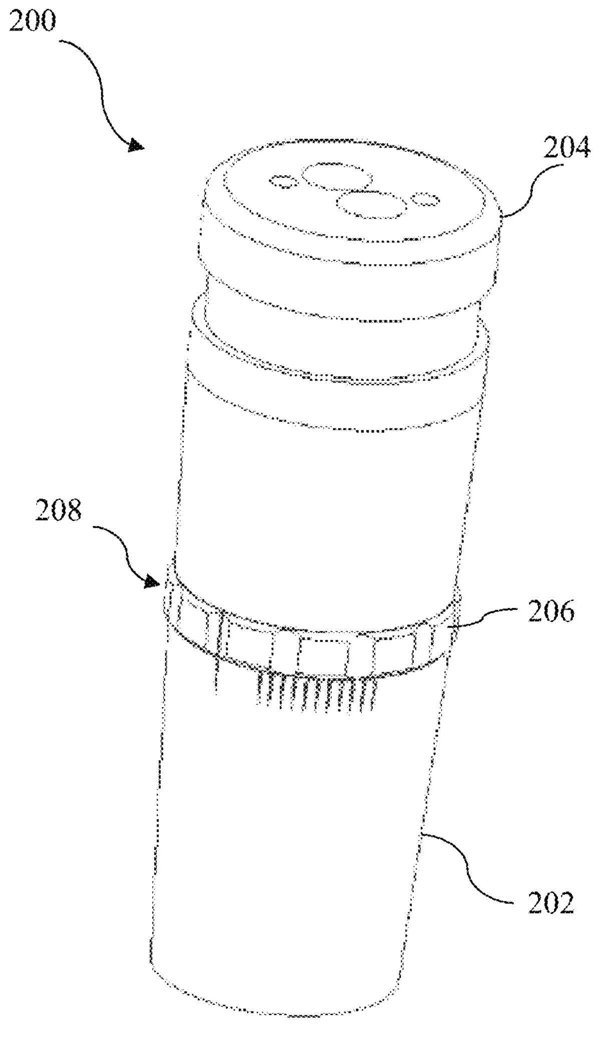
FIG. 7 illustrates a perspective view of a second embodiment of an air pressure regulation device of the present technology.
Figure 8:
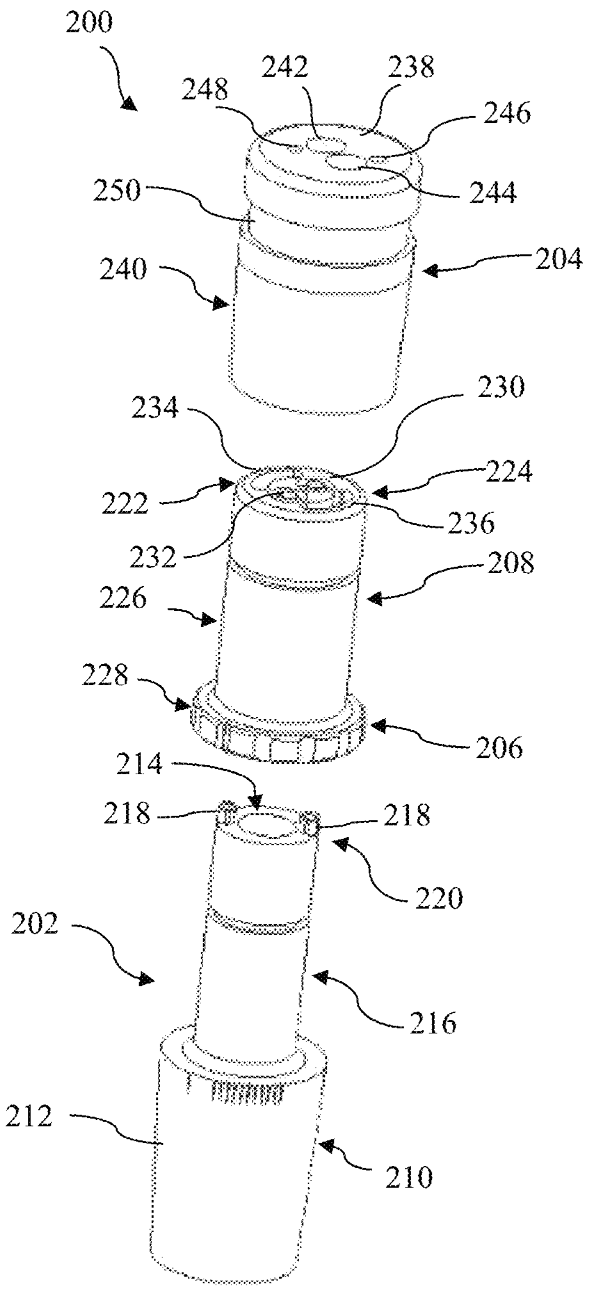
FIG. 8 illustrates an exploded view of the air pressure regulation device of FIG. 7.

FIGS. 7 and 8 illustrate a second embodiment of an air pressure regulation device 200 of the present technology. With reference to FIG. 1, the air pressure regulation device 200 is configured to replace the chanter stock 12, and to receive the chanter reed 14, which is connected to the chanter 16. During operation, air flow to the chanter reed 14 is directed first through the air pressure regulation device 200.

As shown in FIGS. 7 and 8, the air pressure regulation device 200 includes a main body portion 202, a cap 204, and a valve 208 that includes an adjuster 206, which in this embodiment is a dial. In this embodiment, the cap 204 is slidably engages the valve 208, and the valve 208 slidably engages the main body portion 202.

As shown in FIG. 8, the main body 202 includes a stem 210. The stem 210 is shaped as a hollow cylinder, which is configured to receive the chanter reed 14 (FIG. 1), having an outer wall 212 and an air passage 214. The main body also includes an inner shaft 216, and the air passage 214 extends through the inner shaft 216 as well as through the stem 210. The inner shaft 216 may also include at least one boss 218 at the upper end 220 of the inner shaft. As shown in FIG. 8, the inner shaft includes two bosses 218 at the upper end 220 of the inner shaft.

The valve 208 can be used to adjust the amount of air that flows through the air passage 214. The valve 208 includes an air flow cover 222 at a first end 224, and the air flow cover 222 includes at least one air flow aperture. The valve also includes an intermediate shaft 226 that extends between the first end 224 and a second end 228, and the dial 206 at the second end 226. The intermediate shaft is cylindrical and is configured to be slidably received over the inner shaft 216 of the main body 202. In this manner, the valve 208 is slidably connected to the main body 202.

As shown in FIG. 8, the air flow cover 222 includes a first air flow aperture 230 and a second air flow aperture 232. The air flow cover 222 is configured to rotate directly above the air passage 214.

When the dial 206 is moved by a player, by rotating the dial clockwise or counter-clockwise, the valve 208 rotates from a first position, in which the valve 208 is closed, to a second position, in which the valve 208 is open, or any desired intermediate position between the first position and the second position.

The air flow cover 222 of the valve 208 may also include at least one slot that receives the at least one boss 218 of the main body 202. As shown in FIG. 8, the air flow cover 222 includes a first slot 234 that receives a first boss 218 and a second slot 236 that receives a second boss 218. The first slot 234 and the second slot 236 are each elongated and curved, and each slot is configured to retain a boss as the valve 208 rotates from the first position to the second position, or is placed in any position from the first position to the second position. The valve 208 is thus rotatably connected to the main body 202.

Referring to FIGS. 7 and 8, the cap 204 includes a top surface 238 and an outer shaft 240. The outer shaft 240 is cylindrical, and is sized and configured to be slidably received over the intermediate shaft 226 of the valve 208. In this manner, the cap 204 is slidably connected to the valve 208. The cap 204 may also include a groove 250, which is configured to receive the o-ring 18 (FIG. 1) to attach the bag of the bagpipe to the air pressure regulation device 200.

Th top surface 238 includes at least one air flow aperture. As shown in FIG. 8, the top surface 238 includes a third air flow aperture 242 and a fourth air flow aperture 244. The locations of the first air flow aperture 230 and a second air flow aperture 232 of the valve with respect to the third air flow aperture 242 and the fourth air flow aperture 244 of the cap 204 results in openings of varying degrees as the valve 208 rotates, allowing incremental adjustment of the amount of air that flows through the cap 204 and the valve 208 into the air flow passage 214. The air flow apertures may each be any suitable shape, such as circular or tear shaped.

The top surface 238 may also include at least one fastener hole, through which a fastener (not shown), such as a screw, may be inserted into a boss 218 of the main body 202. The cap 204 may thus be connected to the main body 202 by the at least one fastener (not shown). As shown in FIG. 8, the top surface 238 includes a first fastener hole 246 and a second fastener hole 248. The cap 204 may thus be connected to the main body 202 by inserting a first screw through the first fastener hole 246 into a first boss 218, and a second screw through the second fastener hole 248 into a second boss 218.

Figure 9:
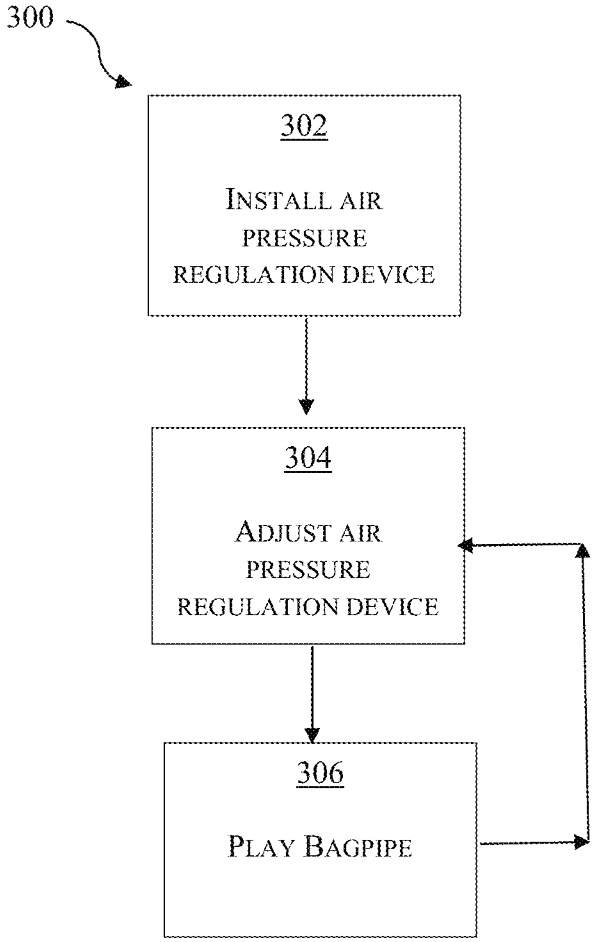
FIG. 9 illustrates a method of using an air pressure regulation device in a bagpipe.

FIG. 9 illustrates one embodiment of a method 300 of using an air pressure regulation device of the present technology to play a bagpipe. The method 300 begins at step 302, which includes installing an air pressure regulation device on a bagpipe. The air pressure regulation device used in the method is an air pressure regulation device of the present technology, and may be an air pressure regulation device 100 or an air pressure regulation device 200, as discussed above. In examples where an air pressure regulation device 100 is used, the step of installing the air pressure regulation device may include slidably inserting the stem 110 of the air pressure regulation device 100 into the upper portion 20 of the chanter stock, as shown in FIG. 1. In examples where an air pressure regulation device 200 is used, the step of installing the air pressure regulation device may include replacing a chanter stock of the bagpipe with the air pressure regulation device 200. The method may proceed to step 304, which includes adjusting the air pressure regulation device. Adjusting the air pressure regulation device may include rotating the valve, such as valve 108 (FIG. 4) or valve 208 (FIG. 8), to a desired position. The method may proceed to step 306, which includes playing the bagpipe. Playing the bagpipe may include directing air flow to the chanter reed 14 through the air pressure regulation device. It should be noted that steps 304 and 306 may be performed in any desired order, and may be performed multiple times in any desired order.

Pressure Gauge Test

In general, reed strength varies from 18 $H_2O$ to 40 $H_2O$. Reeds of four various strengths, each being between 18 $H_2O$ and 40 $H_2O$ were tested using a 3D printed air pressure regulation device of the present technology. The air pressure regulation device was installed with respect to each reed, and, a pressure gauge was sealed to the open end of the chanter stock. Once placed in the chanter, each reed was blown such that air flow traveled through the gauge and the air pressure regulation device. In each instance, it was possible to adjust the air pressure regulation device to reduce and/or increase the amount of air flowing to the chanter reed. It was also possible to stop the flow of air altogether. Additionally, it was found that with the air pressure regulation device in place and adjusted, each individual reed's playing pressure was increased by 2 inches $H_2O$.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. An air pressure regulation device for adjustably controlling air flow to a bagpipe chanter reed, the air pressure regulation device comprising:

a main body including a stem that has an air passage, a valve rotatably attached to the main body, wherein the valve is rotatably adjustable to control an amount of air that flows through the air pressure regulation device; and a cap that is attached to the main body.

2. The air pressure regulation device of claim 1, wherein the valve includes at least one air flow aperture.

3. The air pressure regulation device of claim 1, wherein the cap includes at least one air flow aperture.

4. The air pressure regulation device of claim 1, wherein the valve has an open position, a closed position, and a plurality of intermediate positions.

5. The air pressure regulation device of claim 1, wherein the stem is configured to slidably insert into an upper portion of a bagpipe chanter stock.

6. The air pressure regulation device of claim 1, wherein the main body further includes a platform, the platform having a lever aperture and a first air flow aperture.

7. The air pressure regulation device of claim 6, wherein the is valve rotatably attached to the platform of the main body.

8. The air pressure regulation device of claim 6, wherein the valve includes an air flow cover aligned over the first air flow aperture, wherein the air flow cover includes a closed end, an open end, and a tear shaped second air flow aperture.

9. The air pressure regulation device of claim 6, further comprising a lever that extends through the lever aperture and connects to the valve such that movement of the lever causes the valve to rotate.

10. The air pressure regulation device of claim 6, wherein the cap includes a third air flow aperture that is aligned over the first air flow aperture, with the air flow cover being located between the third air flow aperture and the first air flow aperture.

11. The air pressure regulation device of claim 1, wherein the cap slidably engages the valve, and the valve slidably engages the main body portion.

12. The air pressure regulation device of claim 11, wherein the main body includes an inner shaft, the air passage extends through the stem and the inner shaft, and the inner shaft includes at least one boss at an upper end of the inner shaft.

13. The air pressure regulation device of claim 11, wherein the valve includes at least one slot that receives the at least one boss of the main body.

14. The air pressure regulation device of claim 11, wherein the valve includes an air flow cover that includes at least one air flow aperture, an intermediate shaft that extends between the first end and a second end, and a dial at the second end.

15. The air pressure regulation device of claim 11, wherein the cap includes a top surface and an outer shaft, and the top surface includes at least one air flow aperture.

16. A method of using an air pressure regulation device to play a bagpipe, the method including:

installing an air pressure regulation device on a bagpipe;

adjusting the air pressure regulation device; and playing the bagpipe.

17. The method of claim 16, wherein installing an air pressure regulation device includes slidably inserting a stem of the air pressure regulation device into an upper portion of a chanter stock of the bagpipe.

18. The method of claim 16, wherein installing an air pressure regulation device includes replacing a chanter stock of the bagpipe with the air pressure regulation device.

19. The method of claim 16, wherein adjusting the air pressure regulation device includes rotating the valve to a desired position.

20. The method of claim 16, wherein playing the bagpipe includes directing air flow to a chanter reed of the bagpipe through the air pressure regulation device.

* * * * *